(12) United States Patent
Eichenberger et al.

(10) Patent No.: US 11,827,046 B2
(45) Date of Patent: Nov. 28, 2023

(54) SECURITY DOCUMENT WITH LIGHTGUIDE HAVING A SPARSE OUTCOUPLER STRUCTURE

(71) Applicant: ORELL FÜSSLI AG, Zürich (CH)

(72) Inventors: Martin Eichenberger, Zollikon (CH); Guillaume Basset, Huningue (FR)

(73) Assignee: ORELL FÜSSLI AG, Zürich (CH)

( * ) Notice: Subject to any disclaimer, the term of this patent is extended or adjusted under 35 U.S.C. 154(b) by 0 days.

(21) Appl. No.: 17/795,357

(22) PCT Filed: Jan. 18, 2021

(86) PCT No.: PCT/EP2021/050907
§ 371 (c)(1),
(2) Date: Jul. 26, 2022

(87) PCT Pub. No.: WO2021/151699
PCT Pub. Date: Aug. 5, 2021

(65) Prior Publication Data
US 2023/0065749 A1    Mar. 2, 2023

(30) Foreign Application Priority Data

Jan. 27, 2020 (WO) ................ PCT/EP2020/051878

(51) Int. Cl.
*B42D 25/00*   (2014.01)
*G02B 6/00*    (2006.01)
(Continued)

(52) U.S. Cl.
CPC ......... *B42D 25/309* (2014.10); *B42D 25/351* (2014.10); *G02B 6/34* (2013.01); *B42D 25/23* (2014.10); *B42D 25/24* (2014.10)

(58) Field of Classification Search
None
See application file for complete search history.

(56) References Cited

U.S. PATENT DOCUMENTS

2003/0129345 A1   7/2003  Morii et al.
2004/0239099 A1   12/2004 Tompkin et al.
(Continued)

FOREIGN PATENT DOCUMENTS

| CN | 1568264 A | 1/2005 |
|---|---|---|
| CN | 1615224 A | 5/2005 |

(Continued)

OTHER PUBLICATIONS

International Search Report of Application No. PCT/EP2021/050907 dated Mar. 31, 2021.
(Continued)

*Primary Examiner* — Kyle R Grabowski
(74) *Attorney, Agent, or Firm* — LADAS & PARRY LLP (57) ABSTRACT

The security document, such as a passport, comprises a lightguide having an incoupler structure and in outcoupler structure. The outcoupler structure is sparse in the sense that any part of the protective area is close to a part of the outcoupler structure. However, to secure a large protective area with a limited amount of incoupled light, outcoupler structure covers no more than 20% of the protective area. This allows to protect a large area of the security document, such as a photograph or other personalized information, by means of the lightguide.

6 Claims, 8 Drawing Sheets

(51) Int. Cl.
*B42D 25/309* (2014.01)
*B42D 25/351* (2014.01)
*G02B 6/34* (2006.01)
*B42D 25/23* (2014.01)
*B42D 25/24* (2014.01)

(56) References Cited

U.S. PATENT DOCUMENTS

| | | | |
|---|---|---|---|
| 2005/0128590 A1 | 6/2005 | Schilling et al. | |
| 2007/0058260 A1 | 3/2007 | Steenblik et al. | |
| 2009/0009868 A1* | 1/2009 | Wu | G02B 6/124 359/569 |
| 2011/0182076 A1 | 7/2011 | Sherman et al. | |
| 2012/0162770 A1 | 6/2012 | Walter et al. | |
| 2013/0056972 A1* | 3/2013 | Muller | B42D 25/29 283/85 |
| 2014/0028012 A1 | 1/2014 | Petiton et al. | |
| 2015/0145239 A1* | 5/2015 | Eichenberger | B42D 25/351 283/92 |
| 2020/0019740 A1 | 1/2020 | Sauter | |
| 2022/0009267 A1* | 1/2022 | Eichenberger | B42D 25/351 |

FOREIGN PATENT DOCUMENTS

| | | | |
|---|---|---|---|
| CN | 101379423 A | 3/2009 | |
| CN | 102138086 A | 7/2011 | |
| CN | 102781629 A | 11/2012 | |
| CN | 103597380 A | 2/2014 | |
| DE | 102005052326 A1 | 5/2007 | |
| DE | 102008033718 A1 | 1/2010 | |
| DE | 102014015282 A1 | 4/2016 | |
| EP | 0364730 A1 | 9/1989 | |
| EP | 2732978 A1 | 12/2009 | |
| EP | 2447743 A1 | 5/2012 | |
| EP | 3205512 A1 * | 8/2017 | ........... B42D 25/328 |
| EP | 3470896 A1 | 4/2019 | |
| JP | 2007203568 | 8/2007 | |
| WO | 2003059643 A1 | 7/2003 | |
| WO | 2010006805 A2 | 1/2010 | |
| WO | WO-2010006805 A2 * | 1/2010 | ............. B42D 25/29 |
| WO | 2011072405 A1 | 6/2011 | |
| WO | 2017217428 A1 | 12/2017 | |
| WO | 2018159413 A1 | 9/2018 | |

OTHER PUBLICATIONS

Written Opinion of Application No. PCT/EP2021/050907 dated Mar. 31, 2021.
Office Action issued for co-pending Chinese patent application 202180010441.8 dated Jul. 18, 2023.
Office Action issued for U.S. Appl. No. 17/795,194 dated Jul. 10, 2023.

* cited by examiner

SECURITY DOCUMENT WITH LIGHTGUIDE HAVING A SPARSE OUTCOUPLER STRUCTURE

CROSS-REFERENCE TO RELATED APPLICATIONS

This application is a national stage entry of International Patent Application No. PCT/EP2021/050907 filed on 18 Jan. 2021, which claims priority from International Patent Application No. PCT/EP2020/051878 filed at the European Patent Office on 27 Jan. 2020. The aforementioned patent applications are hereby incorporated by reference in their entirety.

TECHNICAL FIELD

The invention relates to a security document having an optical lightguide, wherein the lightguide comprises an incoupler structure for coupling light into the lightguide and an outcoupler structure for coupling light out of the lightguide. The invention also relates, to a light guiding foil for such a document.

BACKGROUND ART

Security documents having lightguides as a security feature have been known, e.g. from WO 2011/072405 and EP 2732978.

The lightguides can be used to check the document's authenticity.

DISCLOSURE OF THE INVENTION

The problem to be solved by the present invention is to improve the protection provided by such lightguides.

This problem is solved by the security document of the independent claim. Accordingly, the security document has an optical lightguide, which lightguide comprises at least the following elements:

An incoupler structure: This is a structure adapted and structured to couple light into the lightguide.

An outcoupler structure: This is a structure adapted and structured to couple guided light out from the lightguide.

A protective area: This area, which can comprise part or all of the light guide, can be used for protecting a given region of the security document. It has a longest diameter D. In this context, a "diameter" is a straight line going through the geometric center of the area and extending from one edge to the opposite edge of the area.

The security document further fulfills the following conditions:

The outcoupler structure covers no more than 20%© of the protective area.

For any point in the protective area, the shortest distance d to a part of the outcoupler structure is less than D/3.

The last two conditions ensure that the outcoupler structure covers a comparatively small part of the protective area but is, in some sense, distributed over several locations of the area, a combination which is termed a 'sparse' outcoupler herein. Such a sparse outcoupler allows to protect a comparatively large area with a small outcoupler coverage. In conventional designs, the outcoupler structure tends to be concentrated and dense, which provides protection for only a small region of the security document. This design is not well suited for protecting a larger area because, if the outcoupler structure were just enlarged to cover a larger area, the coupled out light would become spatially inhomogeneous due to the attenuation it suffers from being coupled out, and a large amount of light and complex outcoupler designs with non-homogeneous outcoupling efficiencies would be required for illuminating all of the outcoupler. Also, a large conventional outcoupler structure would tend to hide the part of the document it covers, which may not be desirable.

If, however, a sparse outcoupler structure is used, it can be scaled to extend over a larger area, protecting it efficiently.

The lightguide, and in particular its protective area, may therefore form an anti-tampering seal for at least part of the data on the security document.

Advantageously, the coverage of the outcoupler structure in the protective area is small, in particular less than 10%. In this context, 'coverage' is the percentage of the protective area that is covered by outcouplers.

On the other hand, the outcoupler structure may be distributed 'homogeneously' over the protective area, in the sense that the distance of any point on the protective area is less than D/4, in particular less than D/10.

The protective area is advantageously large enough to protect macroscopic regions of the security document, i.e. it may extend over at least one continuous region of at least 1 cm², in particular of at least 2 cm². Advantageously, this region is convex.

For the same reason, the shortest diameter D' and/or the largest diameter D of the protective area is/are least 1 cm, in particular at least 2 cm.

It must be noted, though, that in one embodiment, the protective area can also be substantially one-dimensional, i.e. having the shape of a thin stripe, e.g. with the shortest diameter D' being much smaller than the largest diameter D, e.g. D'<D/10.

The lightguide may e.g. also be a security thread having e.g. a width between 4 and 16 mm.

Advantageously, there should be no macroscopic regions in the protective area that are devoid of outcouplers, i.e. the shortest distance d of any point of the protective area to the next part of the outcoupler structure is advantageously no more than 0.5 cm, in particular no more than 0.25 cm. This makes it hard to make macroscopic changes to anything beneath the protective area without such access being visible by a damaged part of the outcoupler structure.

Advantageously, at least part of the outcoupler structure is line-shaped because line structures are easily detected by the unaided eye while they do not cover a large surface, i.e. lines are well-suited for being used in sparse outcouplers. Hence, the outcoupler structure may comprise at least one line-shaped outcoupler in the protective area, which line-shaped outcoupler has a length of at least 5 mm, in particular of at least 10 mm, and a width of no more than 1 mm, in particular of no more than 0.5 mm, in particular of no more than 0.2 mm.

On the other hand, such a line-shaped outcoupler is advantageously wide enough to be easily detected by the unaided eye, i.e. its width is at least 0.05 mm, in particular no more than 0.1 mm.

The invention is particularly well suited for protecting at least part of the personalized information on an identification document, making it harder to tamper with it. Hence, advantageously, the security document is an identification document comprising personalized information of the owner (holder) of the identification document, wherein said protective area extends on at least one side over at least part of the personalized information.

If the personalized information comprises a photograph, the protective area advantageously overlaps with at least 50%, in particular with at least 90%, of the photograph thereby protecting it from tampering.

If the personalized information comprises the owner's name and/or signature and/or birthdate, the protective area advantageously overlaps with at least 50%, in particular with at least 90%, of the name and/or signature, again protecting it from tampering.

If the personalized information comprises an electronic memory chip storing data about the owner, the protective area advantageously overlaps with said memory chip, in particular covers the memory chip. Again, this makes tampering with the chip harder.

The protective area may also overlap with an antenna connected to a memory chip.

The outcoupler structure may also represent a part of a portrait of the owner of the security document, i.e. it can be personalized itself, which further simplifies the verification of its authenticity and renders counterfeiting harder.

In one embodiment, the protective area is convex.

In particular, it may be the convex hull of the outcoupler structure, i.e. the smallest convex shape enclosing all of the outcoupler structure. In that case, all of the outcoupler structure forms a sparse outcoupler as defined herein.

Alternatively, part of the outcoupler structure may form at least conventional, more localized outcoupler.

The invention also relates to a light guiding foil for the document of any of the preceding claims, wherein said foil forms a lightguide comprising
an incoupler structure,
an outcoupler structure,
a protective area having a longest diameter D, wherein
said outcoupler structure covers no more than 20% of said protective area and
for any point in said protective area, a shortest distance to said outcoupler structure is less than D/3.

This foil can be applied to a security document to form the security document described above.

The foil may e.g. be a surface patch, or it may be embedded within the document and e.g. be visible through an opening or a transparent section of the document.

The foil may or may not be in register with the structures of the security document.

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

Lightguide Design

Figure 1:
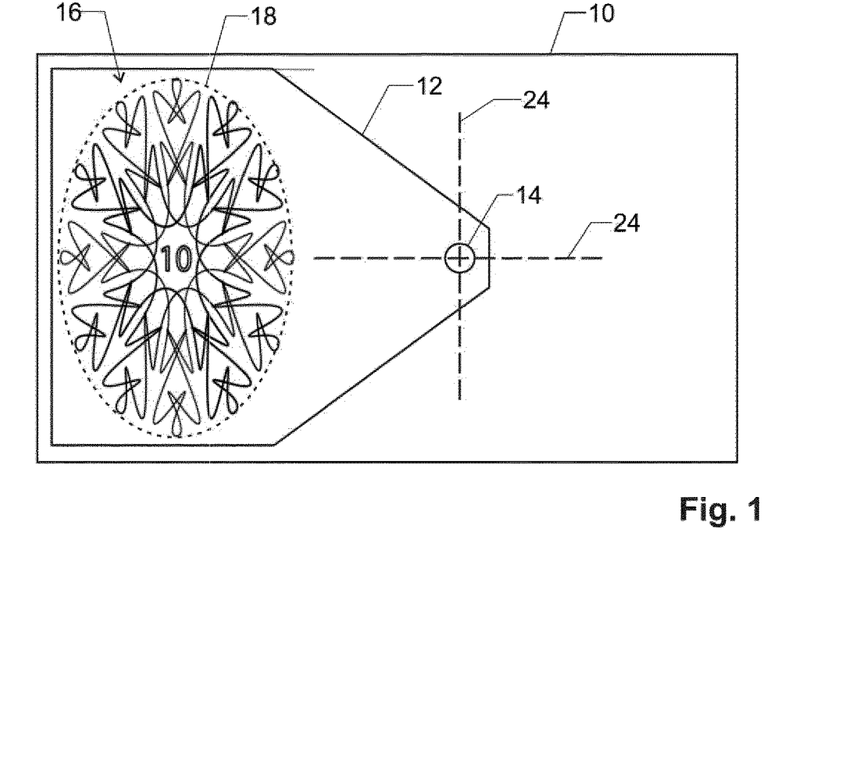
FIG. 1 shows a first embodiment of a security document.

FIG. 1 shows a first embodiment of a security document. The security document comprises a carrier 10, which can e.g. be of paper and/or plastics. It may be flexible or rigid.

Carrier 10 may carry visible markings, in particular printed markings, such as writing or graphical elements, as well as any suitable security features. In addition, carrier 10 carries at least one lightguide 12, which can for example be a film of transparent plastics. In general, the lightguide is a thin, substantially 2-dimensionnal film, patch of films, or stripe of films or a layer of material having a low aspect ratio and whose 2D shape can vary. The lightguide thickness is preferably thinner than 1 mm, in particular thinner than 200 microns, advantageously thinner than 50 microns.

In general, the document may carry other security features, visible or invisible, such features possibly relying on their small dimensions, optical properties, electronics properties, and tactile properties. Such security features may be applied to or integrated in carrier 10, or they may be part of or be formed by other thin foils, paper or plastic substrates, or other parts of the document.

Plastics material is meant to include plastics, reinforced plastic, composite plastics, plastics containing additives, plastic loaded with nanoparticles, microfibers, taggants and the like, cross-linked organic material such as cross-linkable lacquers, hybrid polymer/organic and organic/inorganic matrix materials and the likes, as well as layered films, and do not restrict only to film made of a single polymer.

The film may for example have a core having a high refractive index and coatings, on one or both sides of the core, of lower refractive index, thereby preventing the guided light from being coupled out or attenuated by structures adjacent to the lightguide.

The lower refractive index coatings can be considered as a cladding layer to the core. The core refractive index has advantageously a refractive index higher than 0.05 with respect to the lower refractive index, more advantageously higher by at least 0.1, and even more preferably higher by at least 0.15. In an example, the core may have a refractive index in a given part of the visible spectrum of 1.55 and the cladding 1.4, in another example the core has a refractive index of 1.6 and the cladding of 1.44.

Lightguide 12 is advantageously light guiding for at least one wavelength in a spectral range between 400 and 1000 nm.

Lightguide 12 further comprises an incoupler structure 14 and an outcoupler structure 16.

Incoupler structure 14 may for example be a diffractive grating and/or microlenses. It may be embossed on a surface of lightguide 12, such as on a dedicated surface layer of lightguide 12, and/or embedded within lightguide 12. Alternatively, it may also be formed by a scattering and/or fluorescent region of lightguide 12 and/or by micro-reflectors.

Similarly, outcoupler structure 16 may be embossed on a surface of lightguide 12 and/or embedded within lightguide 12. Alternatively, it may also be formed by a scattering, diffusing, or fluorescent region of lightguide 12. Such outcoupler structure may be realized by additive processes, subtractive processes, material modification processes, such as laser irradiation, or by printing a material onto the lightguide that scatters the guided light or fluorescent material that is excited to fluorescence by the guided light.

Both incoupler structure 14 and outcoupler structure 16 may be adapted to respectively incouple/outcouple light from/to one of the two sides or from/to both sides of lightguide 12. The observation of the outcoupled light can be designed to be on the illumination side or to the opposite side with respect to the illumination side.

Figure 2:
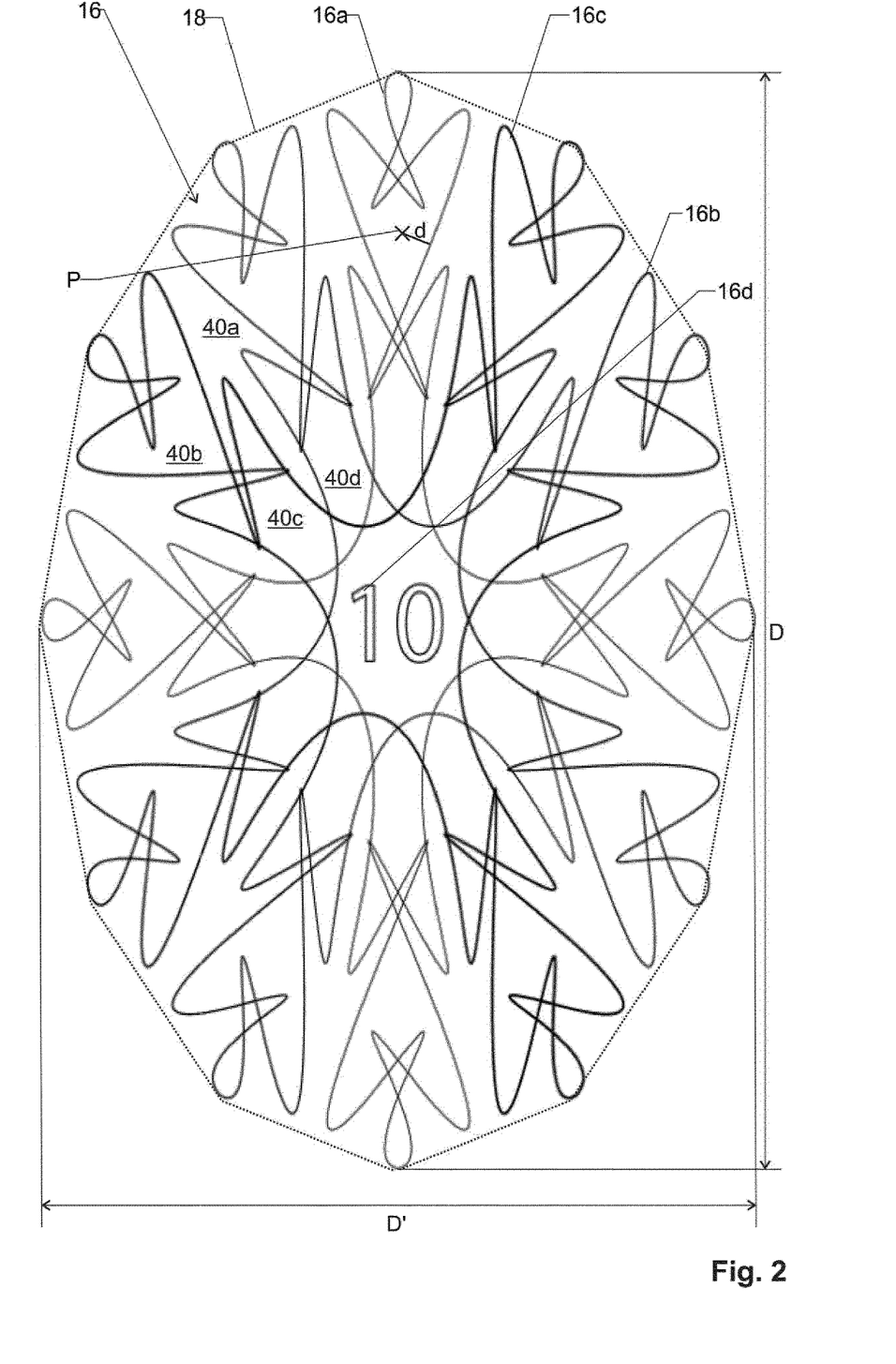
FIG. 2 shows a close-up view of an outcoupler structure.

The design of outcoupler structure 16 is best seen from FIG. 2. In the shown embodiment, it comprises several line-shaped outcouplers 16a, 16b, and 16c. Each such outcoupler 16a, 16b, 16c is formed by a curved line. It may also comprise further elements, such as alphanumeric letters 16d or other symbols.

At least part of outcoupler structure 16 is arranged in a protective area 18. In the shown embodiment, all of outcoupler structure 16 is arranged in protective area 18, and protective area 18 forms the convex hull of outcoupler structure 16.

Outcoupler structure 16 is, at least within protective area 18, 'sparse' as defined above. In other words, outcoupler structure 16 covers no more than 20%, in particular no more than 10%, of protective area 18.

In addition, any point P within protective area is close to at least part of outcoupler structure 16. If we assume that D is the largest diameter of protective area 18, this means that any point P has a distance d of less than D/3, in particular of less than D/4, in particular less than D/5, in particular less than D/10, from the closest part of outcoupler structure 16.

This design ensures that no point P on protective area 18 is far away from outcoupler structure 16. Hence, any attempt to counterfeit or forge a macroscopic region of the security document, for example, by removing lightguide 12 locally, splitting it apart from the document, drilling small holes in it, locally grinding the document in the protective area or by other attack techniques, is likely to destroy at least part of outcoupler structure 16. This can be detected easily by sending light into the lightguide by means of incoupler structure 14 and by optically verifying outcoupler structure 16.

As mentioned above, protective area 18 is advantageously large enough to cover a macroscopic area of the security document. Hence, advantageously its smallest diameter D' as well as its largest diameter D are at least 1 cm.

As it has also been mentioned above, outcoupler structure 16 may comprise at least one line-shaped outcoupler 20. In this context, 'line-shaped' means that the outcoupler 20 extends along straight or curved line as e.g. shown in FIG. 3.

For example, the outcoupler(s) may form a guilloche pattern.

Figure 3:
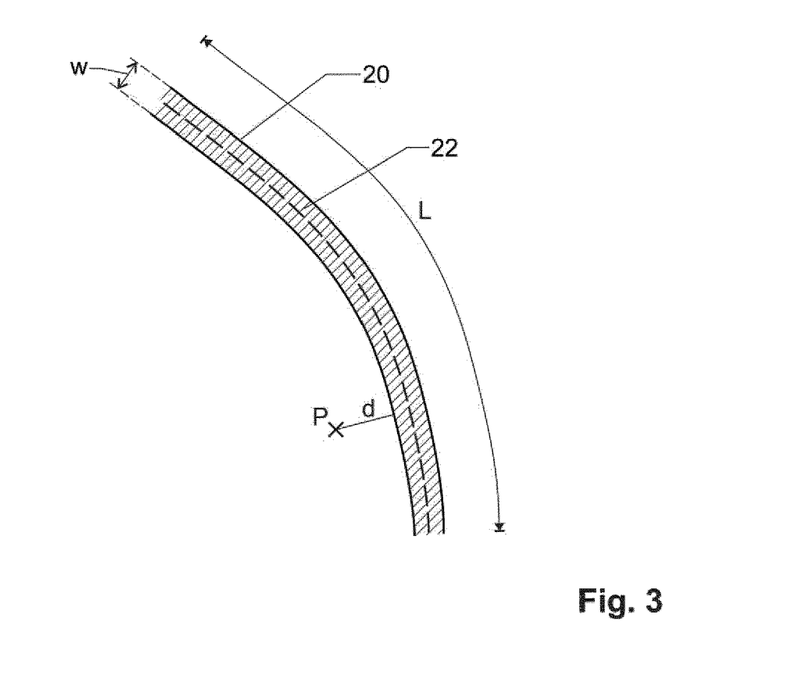
FIG. 3 shows a detail of a line-shaped outcoupler.

Line-shaped outcoupler 20 has a width w (perpendicular to its longitudinal direction) that is much smaller than its length L (along its longitudinal direction). Advantageously, length L is at least 5 mm, in particular at least 10 mm, and/or width w is no more than 1 mm, in particular no more than 0.5 mm, in particular no more than 0.2 mm.

On the other hand, though, width w is advantageously at least 0.05 mm, in particular at least 0.1 mm in order to make the outcoupler well visible to the unaided eye.

Advantageously, there is a plurality of such line-shaped outcouplers, in particular at least 5, in particular at least 10, which allows to distribute them over the protective area for better protection and visual detection.

FIG. 3 also shows, in enlarged fashion, a portion of a sparse outcoupler, for example consisting of a diffractive grating 22 that couples light out from lightguide 12.

To verify the authenticity of the security document, a user may shine light onto incoupler structure 14, with said light having a suitable wavelength and direction to be coupled into the lightguide.

Incoupler structure 14 is structured to deflect the light to propagate into the direction of outcoupler structure 16, such that outcoupler structure 16 is well illuminated by the incoming light. Outcoupler structure 16 then deflects the light out of lightguide 12, which makes it light up and become visible.

The user may then check the document's authenticity by verifying that outcoupler structure 16 is complete and undamaged.

Verification can also be performed by machinery.

In order to simplify placing the light source properly onto incoupler structure 14, the security document may comprise suitable markings 24 visible to the unaided eye, e.g. printed markings, that are larger than incoupler structure 14 and that identify the location of incoupler structure 14. In the embodiment of FIG. 1, these printed markings are designed as crosshairs centered on incoupler structure 14. This is particularly useful for properly aligning a bulky light source, such as a smartphone.

Markings 24 may e.g. also comprise a circle or a set of concentric circles or a window.

Advantageously, the markings 24 have an extension of least twice a largest diameter of incoupler structure 14.

Identification Document

Figure 4:
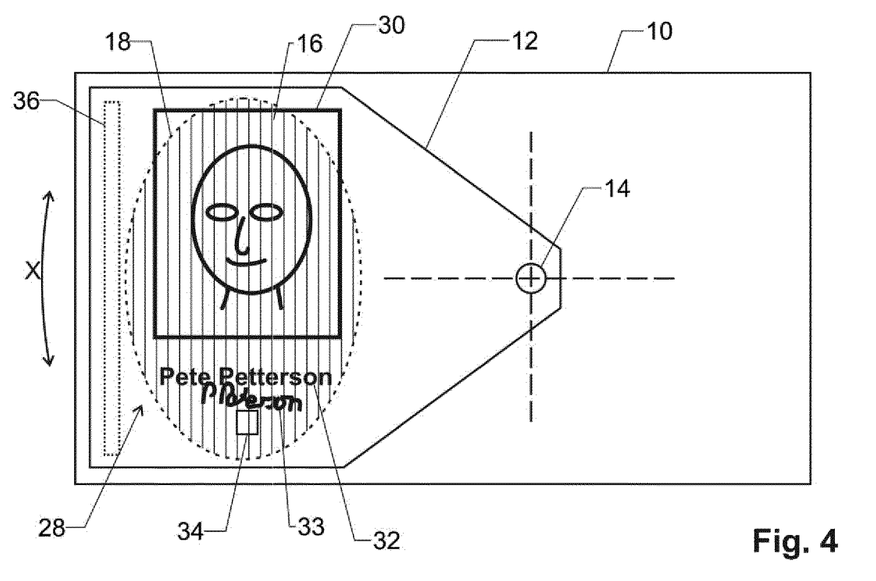
FIG. 4 shows a first embodiment of an identification document.

A particularly advantageous embodiment of the current technique is shown in FIG. 4. Here, the security document is an identification document, such as passport, an ID card, or a personalized access card.

Such a document typically comprises personalized information 28, such as a photograph 30, individualized printed information 32 (such as the owner's name), the owner's signature 33, and/or a memory chip 34 storing individualized data pertinent to the owner, such as name data, biographic data, and/or biometric data. Such a memory chip may be connected to a suitable wireless or wire-bound interface. Chip 34 may e.g. be an RFID chip. The chip with antenna may be integrated in the data page or in the cover page of passports.

In addition or alternatively thereto, personalized information 28 may also comprise a unique ID number and/or a personalized machine-readable zone (MRZ). A machine-readable zone may e.g. be encoded in plain text and/or in machine-specific (i.e. only machine-readable) encoding (e.g. in barcode or datamatrix such as QR-code).

In this case, protective area 18 may overlap with at least part of said personalized information 28.

Advantageously, protective area 18 extends over at least part of personalized information 28, either from the front of the document or from the backside of the document, or from both said sides.

In this manner, personalized information 28 can protected against tampering by making any access thereto difficult.

However, since outcoupler structure 16 is, at least within protective area 18, a sparse outcoupler, the personalized information remains easily visible.

FIG. 4 shows another advantageous aspect of the present invention. Namely, protective area 18 is arranged between incoupler 14 and a lateral outcoupler 36. In this case, at least the part of the light that travels through protective area 16 will be coupled out by lateral outcoupler 36. If lightguide 12 is damaged anywhere between incoupler 14 and lateral outcoupler 36, parts of lateral outcoupler 36 are likely to remain dark during illumination. This provides a further means for checking the integrity of lightguide 12.

Advantageously, lateral outcoupler 36 has an extension of at least 1 cm, in particular of at least 2 cm, in a direction X circumferential and concentric to the center point of incoupler structure 14. This allows to protect a macroscopic area of lightguide 12. It must be noted that lateral outcoupler 36 is advantageously not a sparse outcoupler as defined above, and it is not part of the protective area 18 as defined above (but it may have a protective function, too).

In other words, the document may comprise further outcouplers in addition to the sparse outcoupler structure 16 outside protective area 18.

Lateral outcoupler 36 does not need to be a sparse outcoupler.

Figure 5:
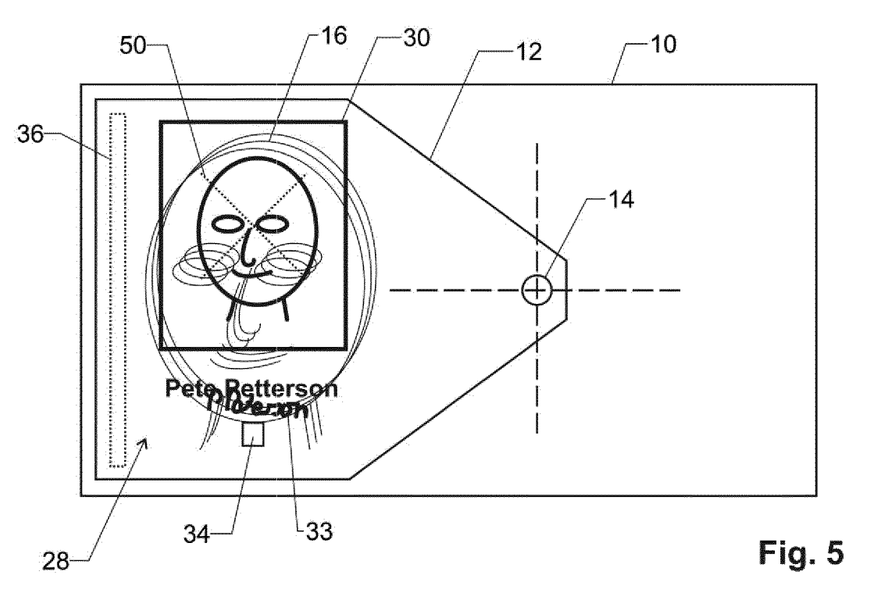
FIG. 5 shows a second embodiment of an identification document.

FIG. 5 shows a further embodiment of an identification document. Here, outcoupler structure 16 represents at least part of the portrait of the owner of the identification document.

In other words, outcoupler structure 16 is personalized to the user, which makes the security feature even harder to fake and easier to verify.

Windows

Figure 8:
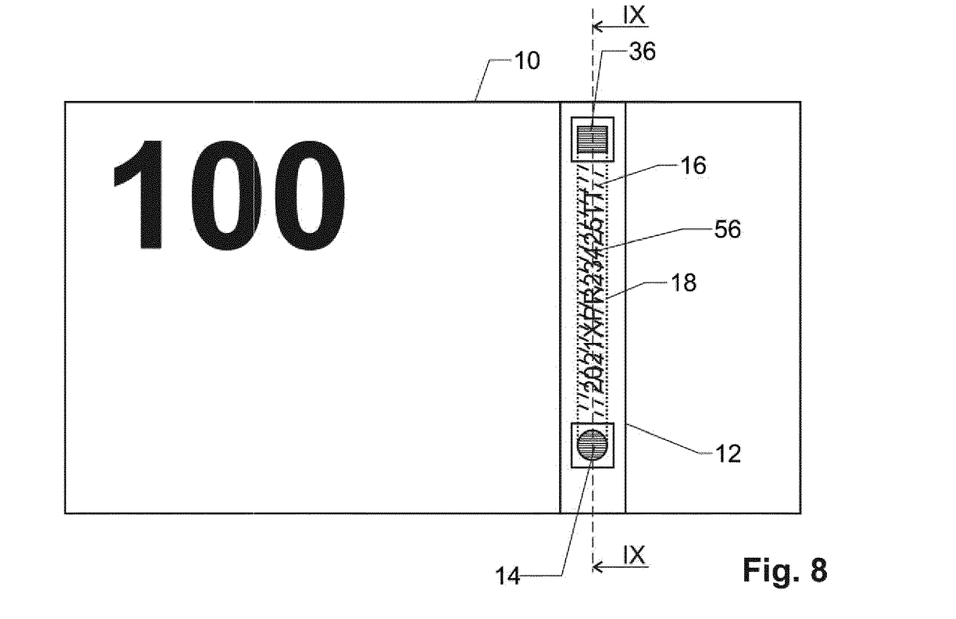
FIG. 8 shows a top view of a further embodiment of a document with one or more windows.
Figure 9:
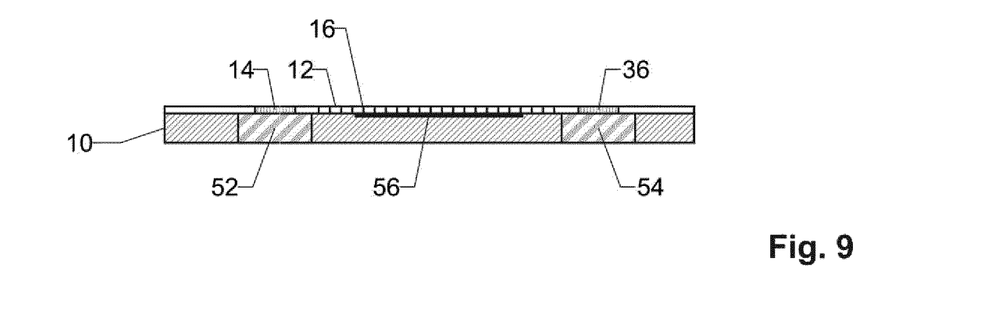
FIG. 9 shows a sectional view (not to scale) along line IX-IX of FIG. 8.

FIGS. 8 and 9 show an embodiment where incoupler structure 14 and/or lateral outcoupler 36 is/are arranged at windows 52, 54 of the document, with the document being, in this case, a banknote.

These windows 52, 54 are designed to be transparent for at least one wavelength that is coupled in/out by incoupler structure 14 and outcoupler structure 16, respectively. In this context, "transparent" advantageously designates that at least 25%, in particular at least 50%, in particular at least 75%, of the light at said wavelength are transmitted through carrier 10 at the location of the window, advantageously without being scattered.

This has the advantage that light may be coupled in from the top or the bottom of the document, at incoupler structure 14 and/or at lateral outcoupler 36. (In this context, "top" designates the side of the document at which lightguide 12 is located, and "bottom" designates the opposite side.)

In the embodiment of FIG. 8, two such windows 52, 54 are provided, with first window 52 being located at incoupler structure 14 and second window 54 being located at lateral outcoupler 36.

However, there may also be only one such window, e.g. at the location of incoupler structure 14, which would allow to place the document on a light source and illuminate it from below, with light going through first window 52 and being incoupled at incoupler structure 14 and then being seen, from above, at outcoupler structure 16 and/or any lateral outcoupler 36.

The embodiment of FIGS. 8 and 9 may also be implemented without a lateral outcoupler 36 and/or without second window 54.

In the case of a banknote, protective area 18 may e.g. cover at least part of another security feature of the banknote, such as its serial number 56.

Incoupler and Outcoupler Structures

In the embodiments above, distinct, dedicated elements have been used as incoupler structure 14 and outcoupler structure 16. It must be noted, though, that the same structure can be used for coupling light into lightguide 12 as well as for coupling light out from lightguide 12.

Figure 10:
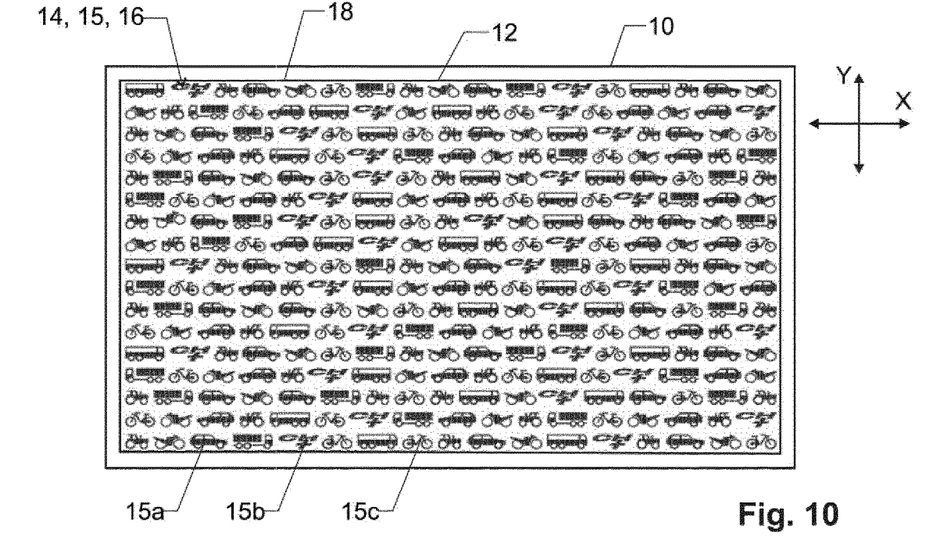
FIG. 10 shows a further embodiment of a security document.

An example of such an embodiment is shown in FIG. 10.

In this embodiment, a structure 15, which can act as incoupler structure 14 as well as outcoupler structure 16, has been provided to extend over protective area 18 (which, in the shown embodiment, basically is equal to the area covered by lightguide 12 because the structure 15 is distributed all over lightguide 12).

Structure 15 may comprise a plurality of substructures 15a, 15b, 15c . . . , each of which can couple light into lightguide 12 or out from lightguide 12. The substructures 15a, 15b, 15c may be non-interconnected or they may be interconnected.

Structure 15 advantageously has the properties of outcoupler structure 16 as described herein. In particular, structure 15 advantageously covers less than 10% of protective area 18.

For any point in protective area 18, the shortest distance to structure 15 is advantageously less than D/3, in particular D/4, in particular less than D/10, with D being the longest diameter of protective area 18.

Advantageously, the convex hull of structure 15 covers at least 75% of the surface of security document 10 and/or of lightguide 12.

This design allows to place a small light source, such as the flash LED light of a smartphone or a small pocket lamp, anywhere over the convex hull of structure 15 to obtain light incoupling into the lightguide and illumination of the security features and obviates the need for a precise placement even if the light source is close to lightguide 12.

For this to work well with small light sources, such as an LED, located close to lightguide 12, the following condition is advantageously met: for any point in protective area 18, the shortest distance to a part of structure 15 is advantageously less than 5 mm, in particular less than 4 mm, in particular less than 3 mm.

Figure 11:
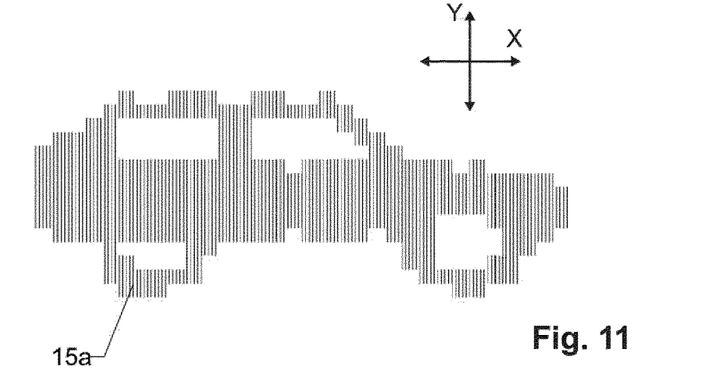
FIG. 11 is a substructure of an anisotropic, diffractive coupling structure with the vertical lines illustrating the diffractive grating.

In the embodiment of FIG. 10, protective area 18 is elongate, having an elongate direction X along which its diameter is at least 50%, in particular at least 100%, larger than in direction Y perpendicular thereto. In that case, incoupler structure 14 and/or outcoupler structure 16, or structure 15 in general, is advantageously designed to anisotropically couple light into and out of, respectively, lightguide 12, with a preferential direction along direction X. This is illustrated for the substructure 15a in FIG. 11, which illustrates the refractive, reflective or diffractive grating of the substructure 15a to extend along Y, thereby primarily coupling in/out light along X.

In this context, a structure that anisotropically couples light into and out of, respectively, the lightguide 12 along the elongate direction X is a structure that has a higher coupling efficiency Ex for light guided along direction. X than the coupling efficiency Ey for light guided along direction Ey, advantageously with Ex>2·Ey.

Figure 12:
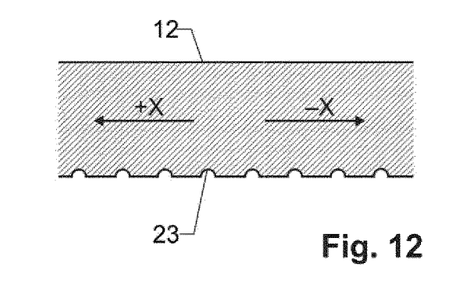
FIG. 12 is a first example of a refractive or diffractive surface structure.
Figure 13:
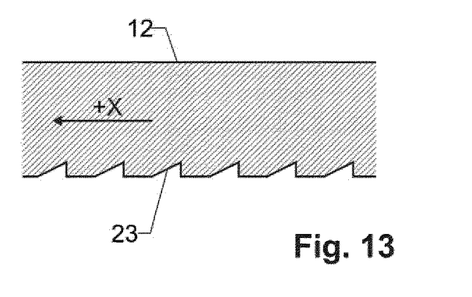
FIG. 13 is a second example of a refractive or diffractive surface structure.

Refractive, reflective or diffractive structures to be used in the coupler structures 14, 15, 16 may e.g. be surface structures 23 in lightguide 12 as shown in FIGS. 12 and 13 and may be nanostructures as well as microstructures.

In the example of FIG. 12, the surface structures 23 are symmetric along direction X, and they therefore have equal coupling efficiency along both vector directions of X, i.e. along +X and along −X.

In the example of FIG. 13, the surface structures 23 are asymmetric along direction X, and they therefore have different coupling efficiency along the vector directions of X, i.e. the coupling efficiency along +X and is not the same as the coupling efficiency along −X.

Advantageously, at least some of the substructures 15a, 15b, 15c of the incouplers and/or outcouplers 14, 15, 16 have higher incoupling efficiency for light guided towards the center of protective area 18 than for light guided away from the center of protective area 18, and/or they have higher outcoupling efficiency for light guided away from the center of protective area 18 than for light guided towards the center of protective area 18. This allows to illuminate the larger portion of the protective area with a larger incoupled portion of light provided by a light source.

Such substructures may be arranged on one or several sides of the center of the lightguide.

Figure 14:
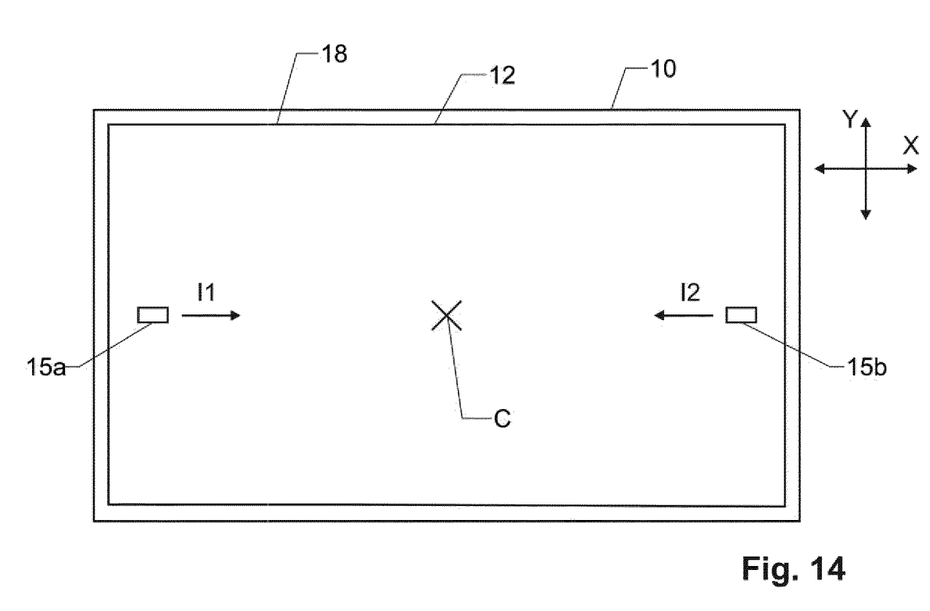
FIG. 14 illustrates a preferential incoupling direction towards the center of the protective area.
Figure 15:
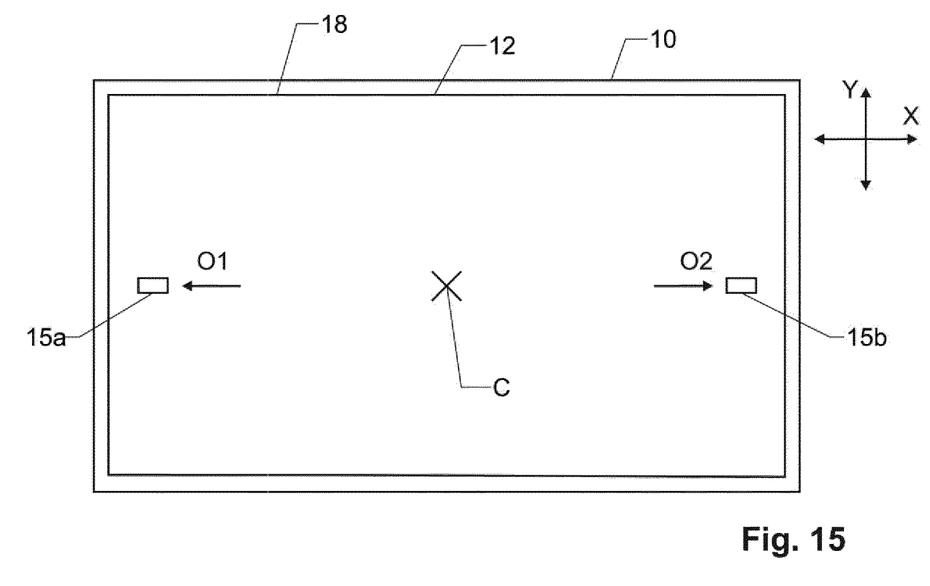
FIG. 15 illustrates a preferential outcoupling direction from the center of the protective area.

This is illustrated in FIGS. 14 and 15, both of which only show two of the (many) coupler substructures at opposite sides from center C of protective area 18, namely the substructures 15a, 15b.

FIG. 14 shows the preferential incoupling directions I1, I2, i.e. the substructures 15a, 15b couple more guided light into the directions I1, I2 towards the center C of protective area 18 than into the opposite directions. FIG. 15 shows the preferential outcoupling directions O1, O2, i.e. the substructures 15a, 15b couple out more guided light from the directions I1, I2 coming from the center C of protective area 18 than from the opposite directions. The incoupling I1, I2 and outcoupling O1, O2 are the time reversal of each other and therefore optimizing for these higher efficiencies using asymmetric couplers can be done simultaneously.

This design is based on the understanding that, for incoupling, it makes more sense to guide light towards the center C of protective area 18 where there are more outcoupling substructures than towards the edges of protective area 18. And, on the other hand, it makes more sense to optimize the outcouplers for light coming from the center C of protective area 18 than for light coming from the edges of protective area 18 because there is a higher likelihood that the user has coupled in light that arrives at the substructures coming from the center C. This is also preferable when using a bulky light source such as the smartphone surrounding the flash LED of the smartphone, as such light sources will cover a part of the protective area in proximity to the area illuminated by the light source.

Notes

As mentioned above, the sparse outcoupler structure 16 advantageously comprises diffractive gratings that are adapted to couple out part of the light guided within lightguide 12.

As it is known to the skilled person, such diffractive gratings can be optimized to couple out light coming from a certain direction and/or having a certain wavelength. This can be used to generate selective outcouplers that, for example, are adapted to couple out light from certain directions only.

Figure 6:
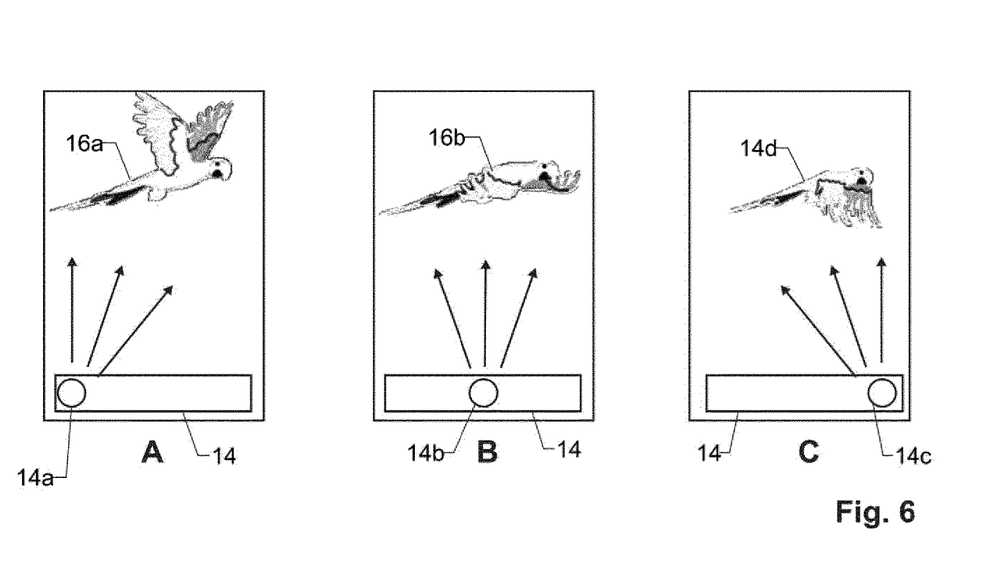
FIG. 6 shows another embodiment of an outcoupler structure in three illumination configurations A, B, and C.

FIG. 6 shows an embodiment using this technique. Here, outcoupler structure 16 comprises three overlaid outcouplers 16a, 16b, and 16c. On the other hand, incoupler structure 14 comprises four spaced-apart incouplers 14a, 14b, and 14c.

Each of these incouplers is designed to illuminate outcoupler structure 16 from different directions, and each incoupler 14a, 14b, and 14c generates light for one of outcouplers 16a, 16b, and 16c. For example, the light from incoupler 14a is coupled out by outcoupler 16a, the light from incoupler 14b is coupled out by outcoupler 16b, and the light from incoupler 14c is coupled out by outcoupler 16c.

Hence, by moving the light source from incoupler 14a to incoupler 14b to incoupler 14c, the three outcouplers 16a, 16c, 16c can be activated sequentially. The three outcouplers have different shapes, which allows to sequentially generate three coupled out images of different shapes. In the present embodiment, the three different images correspond to three different positions of a bird in flight.

As it has been mentioned above, the present technique allows to protect a large area of the security document.

Advantageously, the incouplers and outcouplers are optimized to couple visible light of at least one wavelength between 400 and 1000 nm into and out of lightguide 12. However, they may, for example, also be optimized for infrared light if the security feature is to be detected by a machine.

The protective area 16 can be used to protect any type of security document.

For example, protective area 18 can be used to protect a document representing monetary value, such as a banknote, a cheque, or a voucher. As mentioned above, it may, however, also protect an identification document, such as a passport, an ID card, or a personalized access card (identification badge), and in particular the personalized information thereon.

Protective area 18 may also protect a security foil or security patch which is in turn to be applied to an item to be protected.

Protective area 18 may cover the whole security document or only parts thereof.

In the embodiments above, outcoupler structure 16 comprises, in protective area 18, at least one line-shaped outcoupler. It may, however, also comprises differently shaped outcouplers, such as point-shaped outcouplers.

Above, it has been mentioned that the outcoupler may form a guilloche pattern. Alternatively or in addition thereto, however, it may also form another pattern, such as a pattern of straight lines, in particular a regular pattern of straight lines, as illustrated in the embodiment of FIG. 4, which may be easier to visually verify for integrity.

In the embodiment of FIG. 2, for example, the outcoupler structure comprises a plurality of, in particular at least 10, in particular at least 100, non-interconnected outcoupler-free regions, e.g. at locations 40a, 40b, 40c, 40d, which are mutually separated by outcoupler structure 16. In other words, outcoupler structure 16 "fractures" the protective area into a plurality of outcoupler-free regions and protects them without affecting their transparency.

Figure 7:
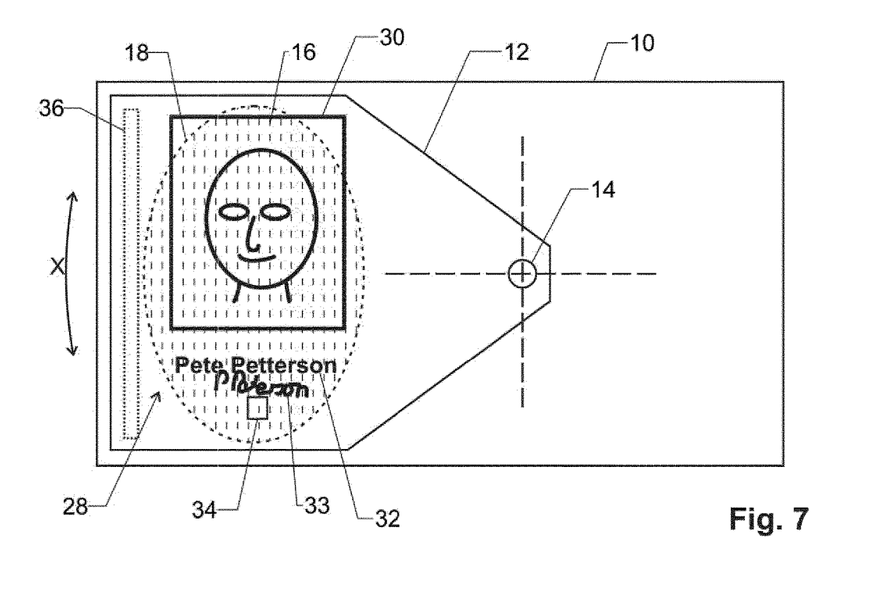
FIG. 7 shows an embodiment with a plurality outcoupler-substructures.

In another embodiment, and as illustrated in FIG. 7, outcoupler-structure 16 comprises a plurality of, in particular at least 10, in particular at least 100, non-interconnected outcoupler-substructures 16a, 16b, 16c, 16d in protective area 18. Again, this allows to distribute the outcoupler structure sparsely over protective area 18.

Advantageously, the plurality of outcoupler-substructures 16a, 16b, 16c, 16d is arranged in a regular pattern. Regular (i.e. repetitive) patterns have the advantage that a user easily detects any defects therein.

The shape of the outcoupler-substructures 16a, 16b, 16c, 16d may vary. In FIG. 7, the substructures are short lines. In FIG. 4, they are long lines. The substructures may, however, also have different geometrical shape and e.g. form dots, symbols, characters, etc.

Incoupler structure 14 and/or outcoupler structure 16 may be adapted to respectively in/out couple light from/to below document, provided the carrier 10 is at least partially transparent in the area where the incoupler structure and/or outcoupler structure Is located. The observation of the outcoupled light can be designed to be on the illumination side or on the opposite side with respect to the illumination side with respect to the document of identification.

As illustrated by way of example in FIGS. 8 and 9, lightguide 12 may (for any embodiments) be strip-shaped, with a length much larger, in particular at least five times larger, than its width, and advantageously with a constant width along its whole length. It may extend across the whole document, i.e. from one of its edges to the opposite edge.

Protective area 18 may comprise at least one further visual security element, in addition to the outcoupler structures. Such a security element 50 is shown, by way of example, as a dotted cross in FIG. 5. This further security document is visible in reflection, i.e. by shining light onto the lightguide without coupling it into the lightguide. It renders it difficult to place e.g. a false photograph or another counterfeiting element on top the lightguide it without being detected. Alternatively such a further security element may be controlled in transmission. Such a further visual security element may e.g. be at least one of an optically variable device, such as a diffractive structure, and non-variable markings, such as printed markings.

Lightguide 10 may be a foil manufactured apart from carrier 10 and then laminated thereto, or it may also be formed in-situ on carrier 10.

Any incoupler and/or outcoupler mentioned herein may e.g. be a diffractive incoupler/outcoupler, a fluorescent/phosphorescent, an Infrared Upconverting incoupler/outcoupler, an incoupler/outcoupler based on microscopic surface structures (i.e. surface structures without diffractive effects, such as microlenses or micro mirrors or surface structures having a lateral repetition period (i.e. a repetition period within the plane of the lightguide) of e.g. at least 10 µm), diffusing or scattering structures or materials.

The incoupler structure may also be placed e.g. between two ends of the lightguide, e.g. with two protective areas on different, in particular opposite, sides of it.

Figure 16:
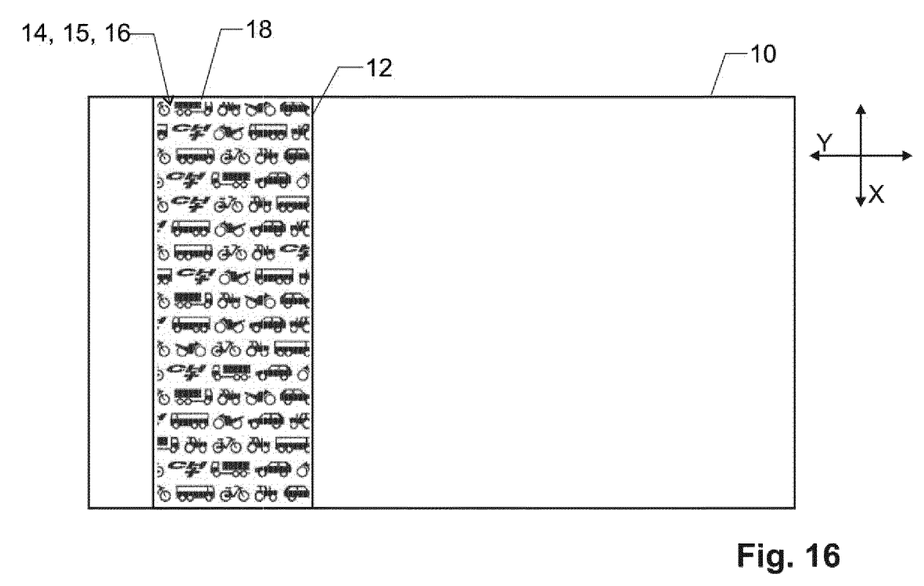
FIG. 16 shows an embodiment of a security document with a strip-shaped lightguide.

The lightguide 12 may also e.g. have the shape of a strip or thread extending across the security document as illustrated in FIG. 16.

While there are shown and described presently preferred embodiments of the invention, it is to be distinctly understood that the invention is not limited thereto but may be otherwise variously embodied and practiced within the scope of the following claims.

The invention claimed is:

1. A security document having an optical lightguide, wherein said lightguide comprises
   an incoupler structure,
   an outcoupler structure,
   a protective area having a longest diameter D, wherein said protective area is a convex hull of said outcoupler structure,
   wherein
   said outcoupler structure covers no more than 20% of said protective area,
   for any point in said protective area, a shortest distance to said outcoupler structure is less than D/3,
   said outcoupler structure comprises a plurality of line-shaped outcouplers in said protective area, wherein said line-shaped outcouplers have length of at least 5 mm and
   a width of no more than 0.5 mm but of least 0.05 mm.

2. The security document of claim 1 wherein said outcoupler structure covers less than 10% of said protective area.

3. The security document of claim 1 wherein said protective area extends over at least one continuous region of least 1 cm$^2$.

4. The security document of claim 1 wherein at least one of a shortest diameter D' and said longest diameter D of said protective area is least 1 cm.

5. The security document of claim 1 wherein said shortest distance d is no more than 0.5 cm for any point in said protective area.

6. The security document of claim 1 wherein said width is no more than 0.1 mm.

* * * * *